S. R. Wilmot,
Drag Saw,
No. 447.
Reissued Apr. 7. 1857.
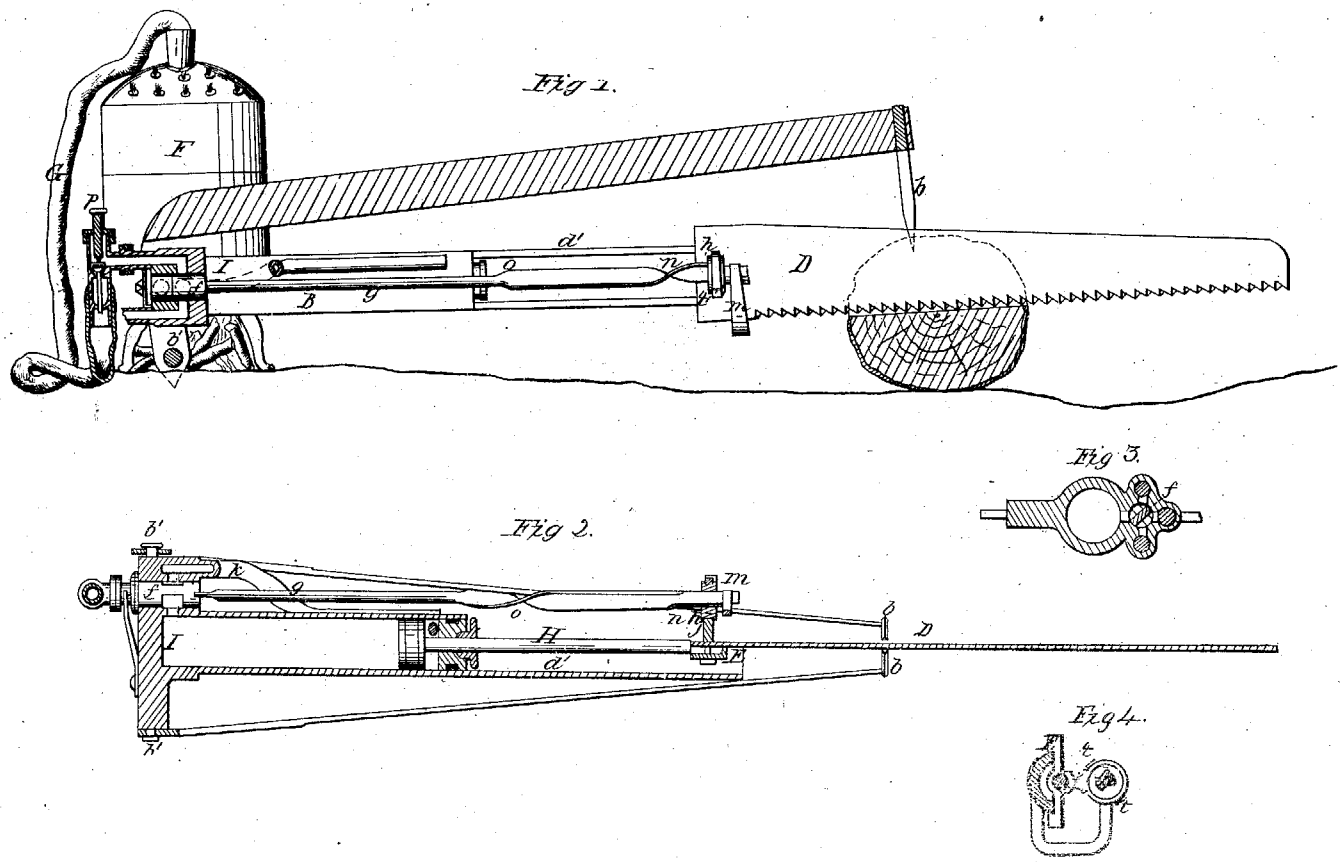

UNITED STATES PATENT OFFICE.

SAMUEL R. WILMOT, OF WATERTOWN, CONNECTICUT.

IMPROVED PORTABLE STEAM CROSSCUT-SAWING MACHINE.

Specification forming part of Letters Patent No. 13,444 dated August 14, 1855; Reissue No. 447, dated April 7, 1857.

*To all whom it may concern:*

Be it known that I, SAMUEL R. WILMOT, of Watertown, in the county of Litchfield and State of Connecticut, formerly of the city, county, and State of New York, have invented a new and useful Portable Steam Sawing Apparatus, of which the following is a full, clear, and exact description, reference being had to the drawings, which are hereunto annexed, in which—

Figure 1 represents a side view of the apparatus, with the valve-chest in section; Fig. 2, a longitudinal section of the apparatus at right angles to the plane of the saw; Fig. 3, a transverse section of the valve and steam-passages, and Fig. 4 a section of the valve-gear and saw, and of the apparatus for guiding the latter.

My invention, although applicable to various purposes, is specially adapted to the cutting down of trees, and to crosscutting them into logs of suitable length. Its object is to produce a truly portable steam sawing apparatus of such light weight that it can be carried around by hand from tree to tree, and can be applied to trees in any position, or at any point of their length, with as great facility as the ordinary crosscut-saw worked by the force of men.

Sawing-machines have been constructed for a number of years by attaching the saw directly to the piston-rod of a reciprocating steam-engine, so that the stroke of the saw and stroke of the engine are the same, and that the mechanism previously used to transmit the force exerted by the saw to the engine is dispensed with. The first requisite in such a machine is that it and the object upon which it is acting shall not change their relative positions, and as a reciprocating steam-engine working at a high speed requires a considerable weight or the exertion of a considerable amount of force to prevent it from moving, it has been customary to secure the engine that drives the saw to a strong frame, or to a heavy bed, which is made fast securely to the building in which the machine is located, or is firmly secured to the ground. As by this mode of constructing the machine the position of the apparatus cannot be altered with respect to the object to be sawed, it has been customary to present the latter to the saw by a carriage, or other equivalent means, and when the saw has completed one cut to move the object with respect to the sawing apparatus preparatory to commencing the succeeding cut.

Although direct-acting steam sawing apparatus constructed upon this principle have proved exceedingly useful in cutting up lumber at saw-mills, to which the logs are brought, they have never, as far as I am aware of, been employed to cut down trees in the woods, or to crosscut the tress as they lie when felled. In fact, they are practically useless and inoperative for these purposes, as the weight of the apparatus is necessarily so great that it cannot be shifted rapidly from place to place without the expenditure of so great an amount of force and labor as will more than counterbalance the gain resulting from the substitution of steam for manual labor. Moreover, the direct-acting steam sawing apparatus hitherto constructed, being practically stationary are fitted for working only in the position in which they are originally placed. Thus, for example, the vertical direct-acting steam saw-mills heretofore in use are fitted for sawing logs longitudinally; and require a change in their frame-work to adapt them to crosscutting, while, on the other hand, a direct-acting steam sawing apparatus constructed as heretofore, for crosscutting in vertical directions logs presented to it by a carriage, is not adapted to the cutting down of trees when the saw has to cut in a horizontal direction.

The object of my invention is to increase the utility of a direct-acting steam sawing apparatus, and to enable it to be constructed of such light weight that it may be moved rapidly from place to place by the exertion of a small amount of force; also, that it may be applied to cut in horizontal or in vertical directions, or at any angle of inclination thereto, so that it is adapted to the cutting down of standing trees and to the crosscutting of them when they have been felled.

My invention consists in combining a saw and a direct-acting steam-engine for driving it, with an apparatus for securing the whole to the tree or other object to be sawed, in such manner that practically the object to be sawed takes the place of the frame, bed, or foundation hitherto employed to prevent the steam-cylinder from changing its position with respect to the object upon which it is acting, thus dispensing with the employment of the frame, bed, or other means heretofore employed for holding the machine in its proper position, and enabling it to be made correspondingly lighter and portable. Moreover, as the heavy bed or frame is dispensed with, and as no foundation is required, and as the machine is rendered independent of any support other than the object upon which it is acting, there is nothing to prevent its application to logs or trees in any position in the woods.

A portable sawing apparatus constructed upon this new principle which I have devised consists, essentially, of a saw, of a direct-acting engine for driving it, and of a device for connecting the engine and saw with the object upon which the saw is to act. This last member of the combination I term a "stock." As the stock must be made fast rigidly to the object, in order to hold the engine in its position, it cannot change its angle of inclination to it, while, on the other hand, as the object is stationary, it is essential that the saw shall be moved in a direction at right angles, or thereabout, to its stroke, in order that it may be fed into the wood. Some means, therefore, must be devised to permit the saw to change its position with respect to the stock. As the saw must necessarily be rigidly secured to the piston of the engine, the engine and saw will move together; hence, in order to obtain the requisite change in the relative positions of the saw and stock, I have connected the engine and saw with the stock by means of pivots, upon which the engine and saw can be swung to feed the latter into the wood. The position of these pivots is not a matter of indifference, because, in order to produce the best result, the feed of the saw into the wood should be as nearly as possible at right angles to the longitudinal movement of the blade in sawing; hence as the saw swings upon the pivots as a center, the farther these pivots are situated from the object being sawed the more nearly will the feed-motion approximate the best direction. I have therefore located the pivots at the butt of the cylinder, which is the farthest distance at which they can be set from the object upon which the saw is acting without elongating the stock and adding a supplementary piece to the butt of the cylinder, which would increase the bulk and weight of the apparatus and impair its portability.

My invention may be applied to practice by different modes of construction by constructing the parts of the apparatus which embodies it upon different plans. In the portable steam sawing apparatus represented in the accompanying drawings the saw D is secured to the outer extremity of a piston-rod, H, whose opposite extremity passes through a suitable stuffing-box into a steam-cylinder, B, and is made fast to the piston C thereof. The steam-cylinder is formed out of a wrought-iron tube, similar to that employed in conveying gas or water, one portion of which is bored truly to serve as the steam-cylinder, while another portion is formed into a guide, *d'*, upon which the brasses of the cross-head E at the outer end of the piston-rod move, in order to guide the latter and the saw. The butt of the steam-cylinder is secured very firmly in a block of metal, I, which contains the steam-valve *f* and the steam-passages. One of the latter proceeds directly from the valve to the adjacent end of the steam-cylinder. Another one of these passages is prolonged by the addition of a tube, K, which forms a side pipe to convey steam to and from the end of the steam-cylinder which is nearer the saw. The steam-valve is of the four-way-cock variety. Its axis is parallel with the direction in which the piston moves, and it is opened from the piston-rod by a valve-motion of peculiar construction, as follows: The valve-stem *g*, by which the cone of the cock is turned, is extended parallel with the piston-rod, and is pivoted in an arm, *m*, secured to the extremity of the guide *d'*. This valve stem is flattened for that portion of its length which corresponds with the stroke of the cross-head E, and is bent or twisted at two points, *n* and *o*, to the same extent that the valve must be turned, in order to change the flow of steam from one end of the steam-cylinder to the other. The flattened portion of the rod is traversed by a slide, *h*, which is secured in a ring-socket in an arm, *j*, projecting from the cross-head E of the piston-rod. This slide is secured in its socket in such manner that it can turn upon the axis of the valve-stem a sufficient distance to turn upon the twisted portion of the valve-stem in moving from either extremity of its stroke toward the center thereof; and also that it shall not turn in the socket of the arm, but shall force the twisted portion of the valve-stem to twist or turn in it when moving from the center of its stroke to either extremity thereof. This limitation of the turning of the slide is effected in this instance by two stops, *t t*, which alternately come in contact with the opposite sides of the arm that supports the slide.

The steam-passage by which steam is admitted from the boiler to the steam-valve is closed by a throttle-valve, *i*, which opens toward the steam-valve, and is forced down upon its seat by a screw, *p*, to throttle or stop the flow of steam from the boiler. The screw *p* is disconnected from the valve, so that when it is screwed out of the valve-chest the valve is free to open whenever the pressure in the boiler exceeds the pressure in the steam-chest, but will close by its weight and shut off the communication with the boiler whenever the pressure in the steam-chest exceeds that in the boiler.

The block of metal to which the engine is made fast is connected by pivots *b' b'* with a stock, A, which extends in the direction of the saw, and is fitted at its farther extremity from the block with dogs *b b*, which extend on each side of the saw, and are driven into the tree or log to be sawed.

The steam-chest is connected with a steam-boiler, F, by means of a flexible pipe, G, which may be made of vulcanized india-rubber, or of canvas cemented therewith sufficiently strong to stand the greatest pressure to which the steam should be raised.

The boiler may be of any convenient and suitable form, and as an economical consumption of fuel in the woods is not a matter of much importance it is recommended that it be made of the simplest form and of the smallest size which will furnish sufficient steam to do the work of sawing.

When this apparatus is to be used in cutting down and crosscutting trees, the boiler is planted in the woods in some convenient position, and the flexible pipe is attached to the boiler, and to the portable steam sawing apparatus. As soon as the steam is got up, the sawing apparatus is applied to a tree, with the saw in a horizontal position, by driving the dogs into the tree, and by supporting the heel of the machine, if necessary, by blocks or other means. The piston is set at the butt of the cylinder. Steam is admitted to the valve by turning up the throttle-valve screw, and the saw is pressed against the tree by prying between the cylinder or the slide and the stock. As the steam passes through the valve and presses upon one side of the piston, it forces the latter forward and impels the saw against the wood, at the same time carrying the slide *h* along the valve-stem. As the slide approaches the forward end of its stroke, it acts upon the twisted portion of the valve-stem, and turning the latter and the valve changes the flow of steam from one side of the piston to the other. As this change is effected while the piston is still moving forward, the steam from the boiler enters in the space of the cylinder through which the piston must pass to complete the stroke of the saw, forms a cushion to check the momentum of the moving parts, and prevents the striking of the piston against the head of the cylinder. This cushioning of the piston by the steam is enhanced by the peculiar formation of the throttle-valve, which closes whenever the pressure of the steam in the cylinder begins to exceed that in the boiler, thus preventing its recoil into the boiler, imprisoning it in advance of the piston, causing it to constitute an elastic cushion which the momentum of the moving parts cannot overcome, and effectually preventing the jarring of the apparatus. As soon as the elasticity of the steam-cushion has overcome the momentum of the piston and its accessories, the latter begins to return in the cylinder under the pressure of the imprisoned steam, carrying the saw back with it over the wood. In this backward movement the slide *h* repasses over the twisted part of the valve-stem, but from its construction, as before described, turns in its arm without imparting motion to the valve, and consequently the steam from the boiler is free to enter the cylinder and press against the piston as soon as the pressure caused by the cushioning of the steam is reduced sufficiently by the onward movement of the piston to permit the throttle-valve to rise under the pressure of steam in the boiler.

The saw is forced on by the steam acting upon the piston until the latter approaches the butt of the cylinder, when the slide again turns the steam-valve and causes the reversion of the movements of the piston and saw. The saw is thus driven to and fro against the wood and quickly forms a deep kerf. As it buries itself in the wood, one or more wedges are entered in the kerf, and are driven in as the sawing proceeds, to keep the kerf from closing by the weight of the tree, and also to give the tree a tendency to fall in the required direction.

As the connection between the sawing apparatus and the boiler is flexible, the former may be applied to cutting down all the trees within a circle of which the boiler is the center and the flexible pipe the radius without moving the boiler, and the fallen trees may be crosscut in pieces of the desired length. In effecting the latter operation the heel of the stock A rests upon the ground, as shown at figure, and the saw feeds itself into the wood by its weight. When all the trees within convenient reach of the boiler have been cut up, the latter may be moved to permit a new group to be cut. As the sawing apparatus and the boiler are, as regards any fixed attachment, independent of each other, each may be set in the position in which it will operate to the best advantage. Moreover, two or more portable steam sawing apparatus may be worked in connection with one boiler. As the employment of the stock connected permanently at one extremity with the cylinder, and temporarily at the other with the tree, causes the tree or other object for the time to take the place of the bed or foundation usually employed to hold a reciprocating steam-cylinder stationary, the apparatus may be made exceedingly light and portable, for the stock takes the place of the holding-down bolts which are generally used to secure a steam cylinder to its foundation or bed. It may therefore be made of no greater size and weight than is necessary to secure the steam-cylinder rigidly to the object, and a steam sawing apparatus constructed upon this principle may, in fact, be made so portable that a single man can carry it about from tree to tree and operate it, even when of a size sufficient to cut down trees of two feet in diameter, and to employ a steam-boiler of four-horse power to generate steam for it.

Having thus described my invention, I will state that I am aware, as hereinbefore set forth, that a saw has been connected directly with the piston-rod of a direct-acting steam-engine when the latter has been secured to a fixed support or basis; I am also aware that a steam-cylinder has been connected with its bed by means of trunnions, so as to permit the cylinder to oscillate, as in the ordinary oscillating engine. I therefore make no claim to the invention of such apparatus, but

What I claim as my invention, and desire to secure by Letters Patent, is—

The combination of a saw and a direct-acting engine for driving it with an apparatus for securing the whole to the object to be sawed in such manner that the latter forms the support or basis by which the steam-cylinder is maintained in the proper position.

In testimony whereof I have hereunto subscribed my name.

SAMUEL R. WILMOT.

Witnesses:

FRED. EMERSON,

JOHN H. RICE.